United States Patent [19]

Dunn

[11] Patent Number: 5,243,173
[45] Date of Patent: Sep. 7, 1993

[54] MACHINE READABLE FORM AND METHOD

[76] Inventor: Ralph T. Dunn, 2704 Sun Meadow Dr., Chesterfield, Mo. 63005

[21] Appl. No.: 775,471

[22] Filed: Oct. 15, 1991

[51] Int. Cl.$^5$ .............................. G06K 7/00; G06K 7/10
[52] U.S. Cl. ..................... 235/375; 235/383; 283/101; 434/346; 434/348
[58] Field of Search ................ 235/383, 375, 462; 283/100, 101, 102, 105, 903; 434/348, 353, 346, 364

[56] References Cited

U.S. PATENT DOCUMENTS

| | | | |
|---|---|---|---|
| 2,798,669 | 7/1957 | Hale | 434/346 X |
| 2,812,957 | 11/1957 | Sarlund | 283/101 |
| 3,505,746 | 4/1970 | Jackson | 434/348 |
| 4,825,058 | 4/1989 | Poland | 235/383 X |
| 4,880,964 | 11/1989 | Donahue | 235/494 X |
| 5,006,699 | 4/1991 | Felkner et al. | 235/375 X |

*Primary Examiner*—Paul M. Dzierzynski
*Assistant Examiner*—Edward J. Glick
*Attorney, Agent, or Firm*—Polster, Lieder, Woodruff & Lucchesi

[57] ABSTRACT

A machine readable form for indicating one or a plurality of selections among a group of options presented on the form. A form member, preferably paper, has printed thereon a plurality of options. Each option has associated therewith a printed machine readable code, for example a bar code. Each machine readable code is initially blocked from the machine scanner by a removable cover such as a removable opaque label. When one or more of the options is selected, the associated covers are manually removed from the chosen codes only. When the entire form is scanned, the machine will be able to read and record only those codes which have been exposed by removal of the cover previously situated over those particular codes. Forms utilizing the disclosed invention provide an increased degree of accuracy in reading and recording preprinted selections on forms.

7 Claims, 1 Drawing Sheet

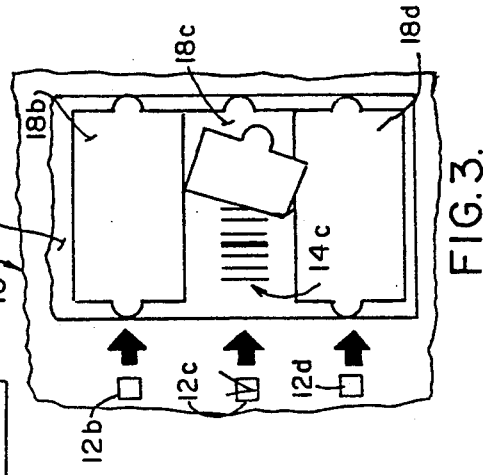

MACHINE READABLE FORM AND METHOD

BACKGROUND OF THE INVENTION

The present invention relates to a novel structure for forms on which are preprinted a plurality of options from which the user is to indicate a selection. The forms may be used to indicate the ordering or the preference of goods or services from a list preprinted on the form. For example, a medical laboratory may supply physicians with forms listing a number of test options which the laboratory offers to be performed on a patient's blood sample. Conventionally, the physician is instructed to place a check mark in a box printed adjacent each option. The form is then sent to the laboratory where it may be manually read and recorded. Other such manually read forms may instruct the user to circle desired options or even print in narrative form the desired options.

More recently, some forms have included preprinted machine readable codes, such as bar codes, which may be scanned by a machine to automatically record the order. These forms also require the user to indicate the desired options by checking a box or circling his selections. The laboratory personnel then scans with a wand, or the like, only those bar codes which are adjacent to the indicated options. While this type of form improves the speed at which desired options may be recorded, it does not preclude the possibility of an error being made by order entry personnel, in that the wrong bar code might be inadvertently scanned or an indicated bar code overlooked. It is, of course also possible that the form user may accidentally check the wrong box further adding to the problem of inaccurate order recording and filling.

SUMMARY OF THE INVENTION

An object of the present invention is to provide a form having preprinted thereon a plurality of options to be discriminatingly selected, which form may be entirely scanned by a machine and only the selected options recorded by the machine.

It is a further object of the invention to provide a form which does not require manual observations of the completed form to effect recordation of the selected options.

It is a still further object to provide a form which is less likely to contain mistakes made by the option selector in selecting desired options.

It is another object to provide a form which can be machine read and recorded more quickly and easily and which provides more accurate recordation of selected options.

Generally speaking, the present invention is a machine readable form for indicating a selection among a plurality of options preprinted on the form comprising a form member, preferably paper, having printed thereon a plurality of options; for example, goods or services which may be ordered; goods or services for which preferences are solicited by a polling concern; answers to examination questions; etc. Also printed on the form adjacent to or associated with each option is a machine readable code which, when scanned by conventional scanning devices, indicate to the preprogrammed machine the particular associated option. A separate cover member is removably affixed over each of the machine readable codes such that initially the cover members prevent the respective codes thereunder from being read by the machine. The selector indicates his selections by removing those cover members from the machine readable codes which are associated with the desired options. In this manner the entire form may be scanned and read by the machine and only the uncovered codes will be readable and recorded by the machine. After the selection process is complete, no manual step need be performed, other than placing the entire form through a scanner, in order for the machine to read and record the selections made.

These, as well as other, objects and advantages will become more readily apparent upon a reading of the following detailed description of a preferred embodiment in conjunction with the drawings wherein:

BRIEF DESCRIPTION OF THE DRAWINGS

FIG. 1 is a representation of an order form for indicating one or more selections among preprinted options utilizing structure according to the principles of the present invention;

FIG. 2 is an exploded representation similar to FIG. 1 except showing machine readable codes printed beneath the code covers; and FIG. 3 is an enlarged representation of the invention showing an individual code cover being partially removed from its underlying code.

DETAILED DESCRIPTION OF A PREFERRED EMBODIMENT

With reference to the drawings, and FIGS. 1 and 2 in particular, there is shown one preferred form of the present invention as it might be used to indicate one or more selections from a group of preprinted options. It is noted at the outset that while the invention is shown being used for a physician's form for ordering blood testing services from a medical laboratory, the invention is equally applicable and advantageous for ordering any goods or services, as well as non-ordering functions such as indicating a preference for a poll or election, or indicating an answer on an examination. The showing and description of a medical services ordering form herein is for illustrative purposes only, and in no way limits the scope of the invention.

FIG. 1 shows an order form generally indicated by the reference character 10. Order form 10 includes, for example, six options shown as Blood Tests A, B, C, D, E and F which are services availably from a medical laboratory and which may be ordered by a physician to be performed on a particular patient's blood sample. Printed on form 10 adjacent to each option A-F is a square box 12a, 12b, 12c, 12d, 12e, 12f, respectively, any of which may be marked by a check mark or an X to indicate on the form the selection of one or more of the options. As shown in FIG. 2, in addition to boxes 12a-12f, there is printed on form 10 a separate machine readable code such as a bar code 14a, 14b, 14c, 14d, 14e, 14f adjacent to each of options A, B, C, D, E, F, respectively. Bar codes 14a-14f are comprised of differing sequences of thin and thick lines or bars spaced at particular intervals such that a conventional scanning machine may read the code and, through conventional preprogramming of the machine, interpret and record the information represented by the code. The machine may then process the information and may then produce a print-out of the information, for example, for instructions to a laboratory technician, for accounting purposes, or even for automatically running the blood tests indicated by the codes read by the machine.

In the preferred embodiment, a substantially transparent, or fully transparent, thin plastic material 16, for example, a material known as BARE BACK manufactured by Bertek, Inc. is overlayed across all of bar codes 14a-14f. Removably affixed onto plastic material 16, over each of bar codes 14a, 14b, 14c, 14d, 14e, 14f is an adhesive backed opaque cover member or label 18a, 18b, 18c, 18d, 18e, 18f, respectively, formed of paper or thin plastic material and preferably of a different color from form 10 to attract the attention of the option selector. An adhesive coating on the back of cover members 18a-8f allows cover members 18a-18f to be held firmly on plastic overlay 16, yet each cover member may easily be separately removed from overlay 16 by insertion of a finger nail under the edge of a cover member and peeling off the particular cover member from overlay 16 to expose the bar code therebeneath.

In order to alleviate mistakes made by the selector, form 10 has printed thereon arrows 24a, 24b, 24c, 24d, 24e, 24f between check boxes 12a-12f and cover members 18a-18f, respectively, to indicate to the selector that in order to select a particular option the box is to be marked and the adjacent cover member is to be removed. Further, instructions 26 printed on form 10 clearly describe the procedure to be followed in order to indicate a selection. Form 10 may also include a preprinted or label affixed bar code 28 to indicate to the machine reader the name and account number of the physician or other information regarding the source of the order.

In use, form 10 is delivered to the physician with all bar codes 14a-14f covered by respective cover members 18a-18f as shown in FIG. 1. For a particular case, the physician may choose to request the medical laboratory to perform Blood Test C. In this case, the physician makes a check mark in box 12c and peels off and discards cover member 18c to expose bar code 14c through transparent overlay 16, as shown in FIG. 3.

When form 10 is received by the medical laboratory, the form may first be checked by personnel to ensure that each box that is checked has the adjacent cover member removed and that each missing cover member has its adjacent box checked. If a discrepancy is discovered, the physician may be contacted to determine the actual selections desired. Assuming no discrepancies are discovered, form 10 is scanned in its entirety by a machine reader which will only be able to read, decode and record those bar codes which have been exposed by the removal of a respective cover member.

While it has been made clear that the preferred embodiment described above is but one example of the numerous uses to which the present invention may be employed, it is repeated that utilization of the invention may be made on any media and in any situation where one or a plurality of selections are to be indicated among a group of options. While the description of a preferred embodiment has been shown to achieve the hereinbefore stated objects and advantages of the invention, the scope of the invention is to be determined solely by the language of the following claims.

What is claimed is:

1. A machine readable form for indicating a selection among a plurality of options preprinted on said form comprising:

a form including a form member on which a plurality of printed machine readable codes are printed thereon;

said printed machine readable codes being readable by a machine independent of the position of a particular code on said form member;

a separate cover member removably affixed over each respective one of said printed machine readable codes, said cover members preventing the respective code thereunder from being read by a machine when said form is read by a machine; and a printed option statement associated with each code printed on at least one of said form member and said cover members to indicate the option associated with a respective one of said codes;

whereby one or more cover members may be removed to reveal an associated machine readable code and the revealed codes may be scanned by a machine and accurately read and recorded independent of the position of the code on the form and independent of the position of the form relative to the machine.

2. The machine readable form as specified in claim 1 and further comprising:

a check box printed on said form member adjacent to each cover member;

whereby the check box can be marked adjacent a particular code which is revealed by removal of a cover member in order to confirm the choice of a particular option.

3. A machine readable form as specified in claim 1 and further comprising:

said machine readable codes are bar codes.

4. A machine readable form as specified in claim 1 and further comprising:

said cover members being substantially opaque.

5. A machine readable form as specified in claim 1 and further comprising:

said machine readable codes are coated with a material which permits complete removal of said cover members from the respective codes thereunder.

6. A method of machine recording selections among a plurality of options printed on a media comprising the steps of:

assigning a machine readable code for each of said options and printing a separate machine readable code on the media for each of said options, said codes being capable of being machine readable independent of the position of the code on the media; removably affixing a separate cover member over each of said codes, said cover members, when affixed, preventing the respective code thereunder from being read by a machine when the media is being read by the machine;

indicating on at least one of the media and cover member each option represented by each cover member and the respective code thereunder;

removing one or more of said cover members which are indicated to be the selections desired; and machine reading said media to determine and read automatically the exposed codes, and the options which are represented thereby, and recording only those options which have had the respective cover members removed.

7. The method as specified in claim 6 and comprising the additional steps of:

marking the media adjacent each code which is revealed by the removal of a cover member;

manually checking the media to confirm that each code revealed has been marked adjacent thereto and checking that each mark made adjacent a code has been revealed to thereby confirm the accuracy of option selections.

* * * * *